United States Patent [19]
Talwar et al.

[11] Patent Number: 6,051,325
[45] Date of Patent: Apr. 18, 2000

[54] JOINING OF MACHINED SANDWICH ASSEMBLIES BY FRICTION STIR WELDING

[75] Inventors: Rajesh Talwar, Chesterfield; Barton Moenster, Ferguson; Ricky L. Martin, St. Peters, all of Mo.

[73] Assignee: McDonnell Douglas Corporation, St. Louis, Mo.

[21] Appl. No.: 08/997,430

[22] Filed: Dec. 23, 1997

[51] Int. Cl.[7] .............................. B23K 20/12; B32B 3/30; F16S 1/02

[52] U.S. Cl. .......................... 428/593; 428/598; 428/654; 228/112.1

[58] Field of Search .................................... 428/593, 598, 428/654, 660, 650, 594; 228/112.1, 113, 114.5

[56] References Cited

U.S. PATENT DOCUMENTS

| | | | |
|---|---|---|---|
| 3,831,262 | 8/1974 | Luc | 29/470.1 |
| 5,273,806 | 12/1993 | Lockshaw et al. | 428/107 |
| 5,460,317 | 10/1995 | Thomas et al. | 228/112.1 |
| 5,697,511 | 12/1997 | Bampton . | |
| 5,713,706 | 2/1998 | Lozano | 411/171 |
| 5,736,221 | 4/1998 | Hardigg et al. | 428/116 |
| 5,862,975 | 1/1999 | Childress | 228/120 |

FOREIGN PATENT DOCUMENTS

| | | |
|---|---|---|
| 0 797 043 A2 | 9/1997 | Japan . |
| 2 306 366 | 5/1997 | United Kingdom . |

OTHER PUBLICATIONS

International Search Report; PCT/US98/27457, mailed Jun. 1, 1999.
*Aluminum Extrusions Form Lighter, Stiffer Engine Cradle,* C. J. Murray, Design News, May 5, 1997.
*Interlocking Structural Panels Surpass Honeycomb's Strength,* M. A. Gottschalk, Design News, Mar. 7, 1994.

*Primary Examiner*—John J. Zimmerman
*Attorney, Agent, or Firm*—Alston & Bird LLP

[57] ABSTRACT

The machined-sandwich structural assembly has two components joined together with a joint of substantially the same strength as the weakest base material. More specifically, the structural assembly includes a first structural member and a second structural member. The first structural member is spaced from the second structural member through a plurality of intermediate members which extend between the first structural member and the second structural member. The plurality of intermediate members are friction stir welded to the first structural member. The resultant assembly requires less stock material, takes less time to machine and has a joint of improved strength.

13 Claims, 4 Drawing Sheets

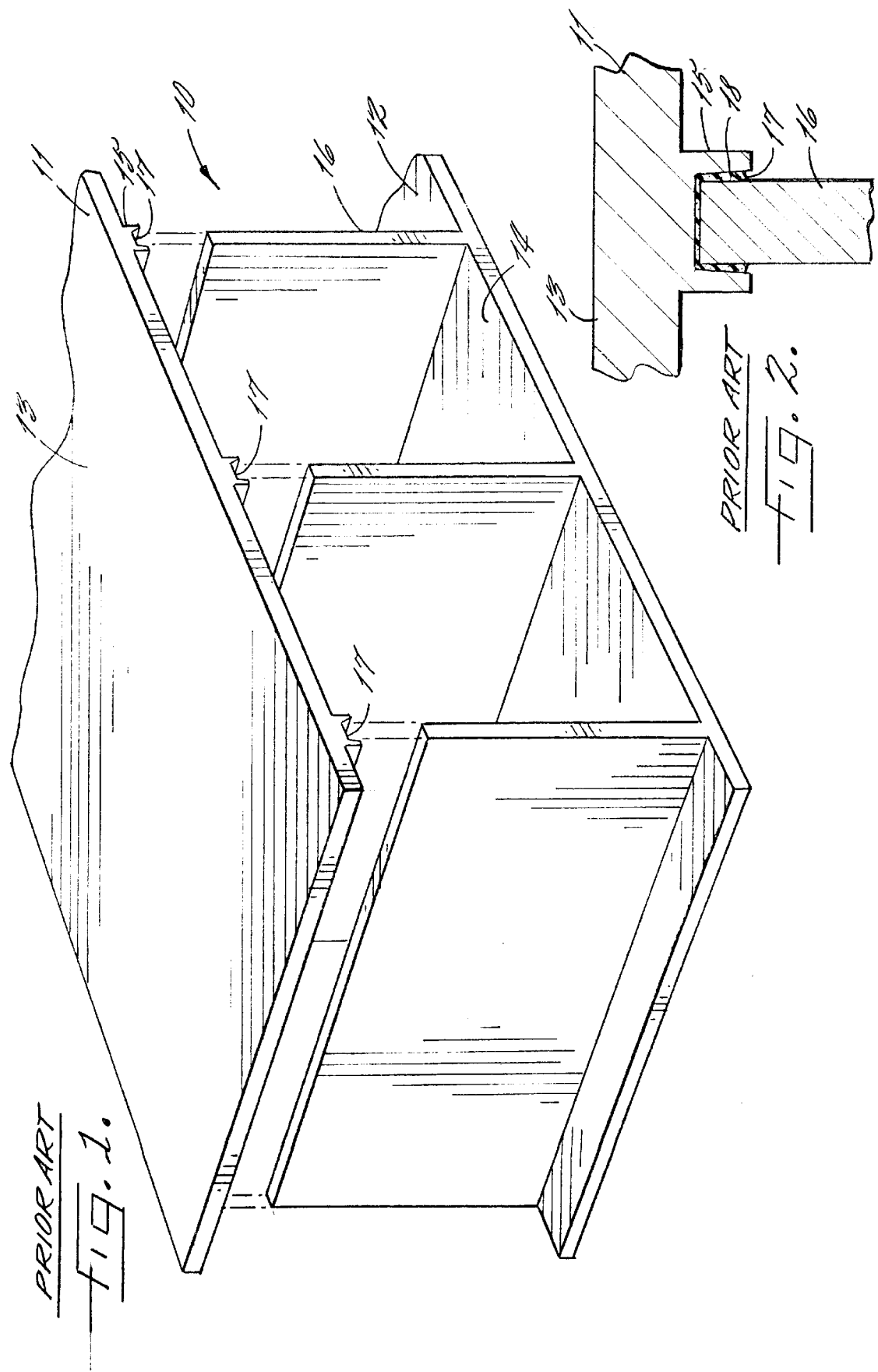

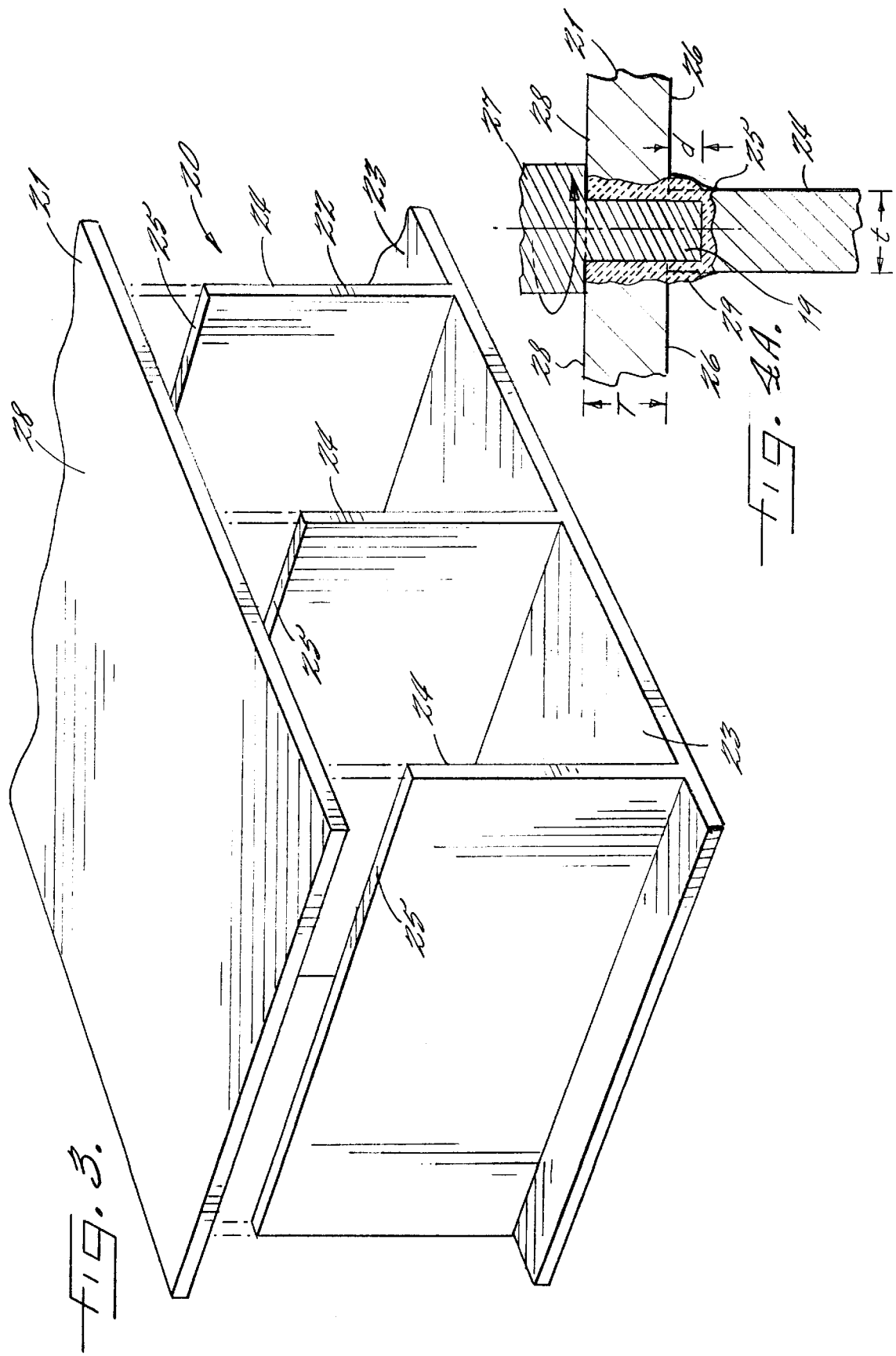

JOINING OF MACHINED SANDWICH ASSEMBLIES BY FRICTION STIR WELDING

FIELD OF THE INVENTION

The present invention relates to structural assemblies and, more particularly, relates to the joining of machined-sandwich assemblies by friction stir welding.

BACKGROUND OF THE INVENTION

Conventional structural assemblies as used in the manufacture of military and commercial aircraft are commonly fabricated using a bonded honeycomb-sandwich construction or a built-up structure. Conventional structural assemblies formed from these types of constructions generally include large numbers of parts and fasteners which can result in extensive tooling and increased labor costs during manufacture and assembly. The component parts of conventional structural assemblies are typically not welded because conventional welding techniques can distort the dimensions and/or shape of the component parts as well as create joints having defects such as porosity, micro-cracking, lack of fusion and poor ductility that can lead to cracking or failure of the joint when subjected to the severe cyclical stresses commonly associated with aeronautical applications.

Additionally, during use, aircraft structural assemblies are subjected to a variety of environmental conditions, temperature variations, severe acoustic and vibration environments, all of which create mechanical and thermal stresses. Over time, the application of cyclical stresses to bonded structural assemblies can lead to disbanding at the joints, and unless repaired, it can result in mechanical failure. Moisture entrapments also can occur during use of the aircraft which in combination with the extreme environmental conditions can result in corrosion which can also weaken the structural assembly. Due to the large number of parts and fasteners utilized in the construction of conventional structural assemblies, maintenance and repair can be time consuming and labor intensive which can be costly over the life of the assembly.

The number of total parts utilized in a bonded honeycomb or built-up structure can also increase the overall weight of the aircraft. Consequently, conventional structural assemblies are generally costly to build and maintain and can adversely affect the weight of the aircraft.

In seeking better structural assembly designs, other types of sandwich structures have been proposed. In particular, one such alternative design is an interlocking design concept such as the Grid-Lock® interlocking assembly of Tolo Incorporated which is described in U.S. Pat. No. 5,273,806 to Lockshaw et al. and which is shown in FIGS. 1 and 2. An interlocking structural assembly 10 includes first and second machined components 11, 12 which are typically fabricated from aluminum or titanium using a CNC milling machine. The components are machined to include generally planar surface portions 13, 14 having a plurality of integral ribs 15, 16 which extend outwardly from a respective surface portion and coincide with the ribs of the other component. The ribs 15 of the first component 11 are further machined to include grooves 17 for matingly receiving the distal ends of the corresponding ribs 16 of the second component 12. The grooves 17 are precisely machined so as to form a tongue and groove assembly which allows the ribs 15, 16 of the first and second components 11, 12 to be snapped together. Additionally, the interlock ribbing 15, 16 are adhesively bonded together with an adhesive 18 such as epoxy or urethane glue.

Interlocking ribs and grooves require extra stock material. Further, the ribs and grooves have to be machined with specific tolerances in order to obtain a secure fit of the interlocking assembly. The precise machining generally requires extra machining time which can increase the overall manufacturing costs and can result in material waste in cases of operator error.

The use of an adhesive to bond the structural assembly also creates the potential for disbonding of the joints due to degradation of the adhesive from heat exposure or environmental conditions and stress. An adhesive bond failure can accelerate corrosion damage or result in a catastrophic failure of the assembly. Although the use of the interlocking assembly assists the adhesive bond in joining the corresponding ribs, the mechanical strength of the joint remains well below that of the base material.

As a result, there remains a need for structural assemblies which can be manufactured and assembled with a minimum number of parts so as to reduce the costs associated with manufacture, assembly and maintenance of the structural assemblies, as well as to reduce the overall weight of the aircraft. The structural assembly must also be capable of providing high mechanical strength and structural rigidity.

SUMMARY OF THE INVENTION

The present invention provides a method of manufacturing a structural assembly including the steps of machining a work piece to form a first structural member having an outer and an inner surface. The first structural member may also be formed into a curvilinear geometry. A second work piece is machine into form a second structural member having a plurality of intermediate members disposed in a predetermined pattern, each of the plurality of intermediate members extends outwardly to corresponding distal ends. The distal ends are machined to form a pre-selected geometry. The inner surface of the first structural member is positioned adjacent to the distal ends of the plurality of intermediate members so that the plurality of intermediate members extend between the first and second structural members. The first and second structural members are secured so as to prevent movement of the first structural member relative to the second structural member and the plurality of intermediate members. The first structural member is then joined to the distal ends of each of the plurality of intermediate members by friction stir welding. The structural assembly is then secured to other structural assemblies to form the frame of an aircraft.

The present invention also provides a structural assembly including first and second structural members. It is particularly advantageous to have at least one of the first and second structural members formed of an unweldable material. The second structural member is spaced from the first structural member and has a plurality of intermediate members which extend outwardly in a predetermined pattern to corresponding distal ends. The distal ends are machined to form a pre-selected geometry. The plurality of intermediate members extend between the first structural member and the second structural member. The distal ends of each of the plurality of intermediate members are joined by means of a friction stir weld joint to the first structural member to form an integral structural assembly.

Accordingly, there has been provided a structural assembly and an associated method of manufacture allowing for the efficient construction of aircraft structural assemblies having a minimum number of component parts and which are joined together through a material bond substantially equal to the strength of the base materials. The resultant assembly requires less stock material and takes less time to machine.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1 is a perspective view showing an interlocking structural assembly as known in the art;

FIG. 2 is a fragmentary cross-sectional view showing the tongue and groove joint of the interlocking structural assembly of FIG. 1;

FIG. 3 is a perspective view showing a partially assembled structural assembly according to the present invention;

FIG. 4A is a fragmentary cross-sectional view showing the joining of the first structural member to the distal end of an intermediate member of the structural assembly of FIG. 3;

DETAILED DESCRIPTION OF THE PREFERRED EMBODIMENTS

Figure 4B:
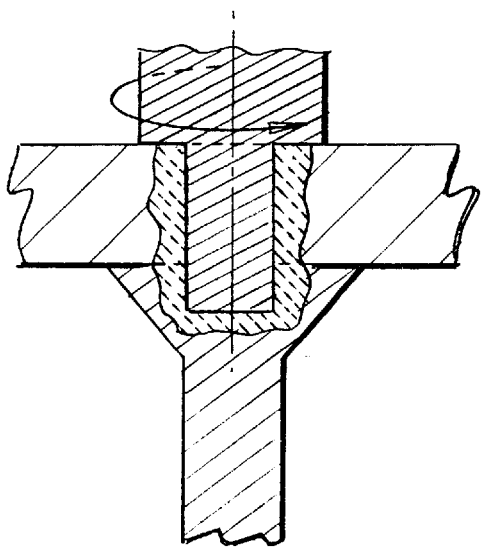
FIG. 4B is a fragmentary cross-sectional view showing the joining of the first structural member to the distal end of an intermediate member having a straight tapered geometry.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to the drawings, and in particular to FIG. 3, there is shown a structural assembly 20 according to the present invention. The structural assembly 20 includes a first structural member 21 which forms the outer skin of one side of the structural assembly. The first structural member 21 can be machined, through known manufacturing means, from a single work piece into a predetermined shape and thickness as required by the specific design loads and specifications. The first structural member 21 may also be formed, through known manufacturing means, into a curvilinear geometry. No extra material Dr machining time is required to machine interlocking grooves, as in the current adhesively bonded sandwich construction.

The structural assembly 20 also includes a second structural member 22 which preferably has a geometry that is evenly mated with the first structural member 21. The second structural member 22 includes a skin portion 23 and a plurality of intermediate members 24 which are formed integrally with the skin portion of the second structural member. Each of the intermediate members 24 extends outwardly from the skin portion 23 in a predetermined pattern to a corresponding distal end 25. The corresponding distal ends 25 are machined to form a pre-selected geometry. Again, the skin portion 23, the intermediate members 24 and the corresponding distal ends of the second structural member 22 can be machined, through known manufacturing means, from a single work piece into a predetermined shape and thickness as required by the specific design loads and specifications. For example, a CNC milling machine can be used to machine both the first and second structural members 21, 22.

The structural assembly 20 is constructed by positioning the first structural member 21 relative to the second structural member 22 such that the plurality of intermediate members 24 extend between the first structural member and the second structural member. In particular, the inner surface 26 of the first structural member 21 is adjacent to the distal ends 25 of the plurality of intermediate members 24. The first and second structural members 21, 22 are then secured so as to prevent motion of the first structural member relative to the second structural member and the plurality of intermediate members 24. For instance, the first and second structural members 21, 22 may be secured to each other by spot welding. Then, structural members 21, 22 may be secured to the work table by means of a conventional clamp (not shown).

The bottom surface 26 of the first outer member 21 is then joined to the distal ends 25 of the plurality of intermediate members 24 by friction stir welding. Specifically, a rotating friction stir welding probe 19 which is attached to a friction stir welding tool 27 is forced through the outer surface 28 of the first structural member 21, through the bottom surface 26 and into the distal ends 25 of the plurality of intermediate members 24. The frictional heat generated by the rotating tool 27 creates a plasticized region or joint 29 as shown in FIG. 4 which solidifies between the first structural member 21 and the distal ends of each of the plurality of intermediate members 24. Advantageously, the first structural member and the intermediate members are disposed in a substantially perpendicular relation. The rotating probe 19 is then moved along a path through the first structural member 21 that traces the respective intermediate member 24 to thereby form a continuous friction stir weld joint along the length of the intermediate member. This friction stir, welding process can then be repeated for each of the plurality of intermediate members 24. See U.S. Pat. No. 5,460,317 to Thomas et al. for a general discussion of friction stir welding, the contents of which are incorporated herein by reference.

In order to create the requisite bond between the plurality of intermediate members 24 and the first structural member 21, the thickness T of the first structural member and the thickness t of each of the intermediate members will depend upon the properties of the material used to form the first structural member and the second structural member 22, respectively. As illustrated in FIG. 4A, the probe 19 will preferably extend through the first structural member 21 and into the corresponding distal end 25 of each of the plurality of intermediate members 24 a distance d, which will again depend upon the material properties of the base materials as well as the thickness t of the intermediate members 24.

Figure 4C:
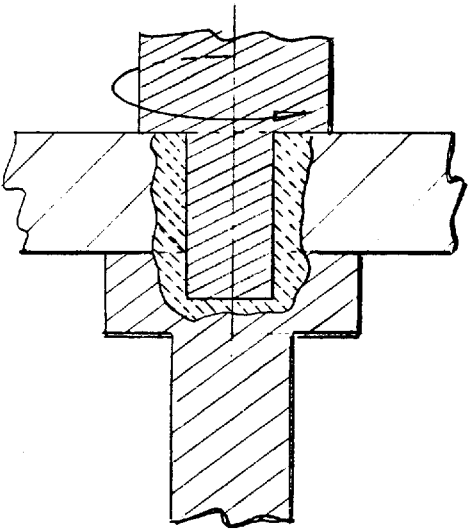
FIG. 4C is a fragmentary cross-sectional view showing the joining of the first structural member to the distal end of an intermediate member having a "T" shaped geometry.
Figure 4D:
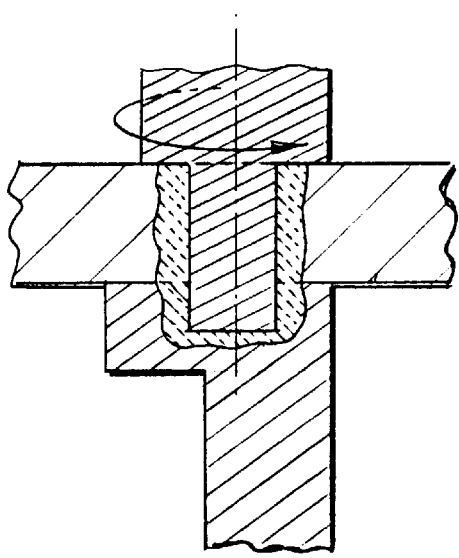
FIG. 4D is a fragmentary cross-sectional view showing the joining of the first structural member to the distal end of an intermediate member having an "L" shaped geometry.
Figure 4E:
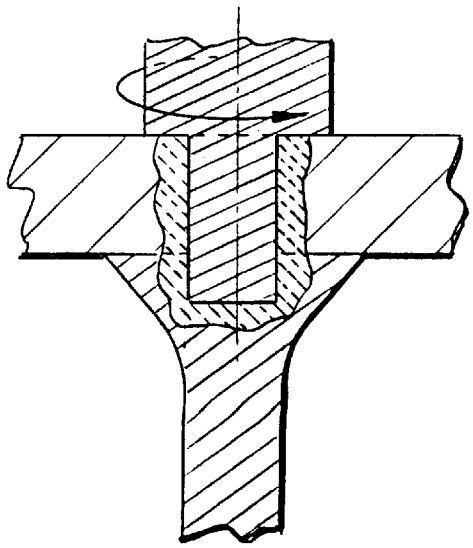
FIG. 4E is a fragmentary cross-sectional view showing the joining of the first structural member to the distal end of an intermediate member having a curved tapered geometry.

As shown in FIGS. 4A–E, the corresponding distal ends 25 of intermediate members 24 may be machined to form a variety of geometries. The geometry of the distal ends 25 are selected based on the geometry of the first structural member 24 as well as the particular load requirements of the joint between the first structural member and the distal end. In FIG. 4A the distal end 25 is machined to form a rectangular geometry. In FIG. 4B, the distal end is machined to form a tapered geometry. In FIG. 4C, the distal end is machined to form a "T" shaped geometry. In FIG. 4D, the distal end is machined to form an "L" shaped geometry, and in FIG. 4E, the distal end is machined to form a circular tapered geometry. Although specific geometries have been illustrated, the distal end can be machined to form other geometries that are also within the scope of the disclosed invention.

The method of the present invention is particularly advantageous to join first and second structural members 21, 22 that are formed of either similar or dissimilar metals which would be unweldable or uneconomical to join by any other means. Unweldable materials, when joined by conventional welding techniques, produce relatively weak weld joints because these materials possess high conductivity and quickly dissipate heat away from the weld joint. Such materials include aluminum and some aluminum alloys, particularly AA 2000 and AA 7000 series aluminum alloys. The method of the present invention permits first and second structural members formed of unweldable materials to be securely joined. The method of the present invention may also be used to securely join weldable materials to other weldable and to unweldable materials. Thus, the method of the present invention permits the materials which form the first and second structural members 21, 22 to be chosen from a wider variety of light weight, high strength metals and alloys, thereby facilitating reduction of the overall weight of the aircraft. Weight and strength are of critical concern in the aerospace industry.

Friction stir welding creates a severely deformed but highly refined grain structure at the weld interface. Further, friction stir welding results in a more narrow heat-affected zone compared to any fusion welding process and is not limited to selected alloys with properties that are suitable for conventional welding. Friction stir welding eliminates a number of defects related to conventional welding, such as micro-cracks, poor ductility, lack of fusion, porosity and most importantly, minimization of distortion which can adversely effect the shape and tolerances of the joined component members. In instances where the first and second structural members 21, 22 are formed of the same material, the joint 29 which consists of the plasticized material from the first structural member 21 and the corresponding distal end 25 of the intermediate member 24 will have substantially the same mechanical properties, including strength, as the base materials. Alternatively, if the materials used to form the first structural member 21 and the plurality of intermediate members 24 are dissimilar, then the joint 29 will have the strength of the weaker material so long as the first structural member and the plurality of intermediate members are each formed from a material, such as aluminum, aluminum alloys, titanium, titanium alloys or the like, which creates a full-strength metallurgical bond when joined through friction welding. Thus, the resulting join 29 in structural assembly 20 is of significantly greater strength than that provided by conventional structural assemblies, especially those utilizing adhesives.

Figure 5:
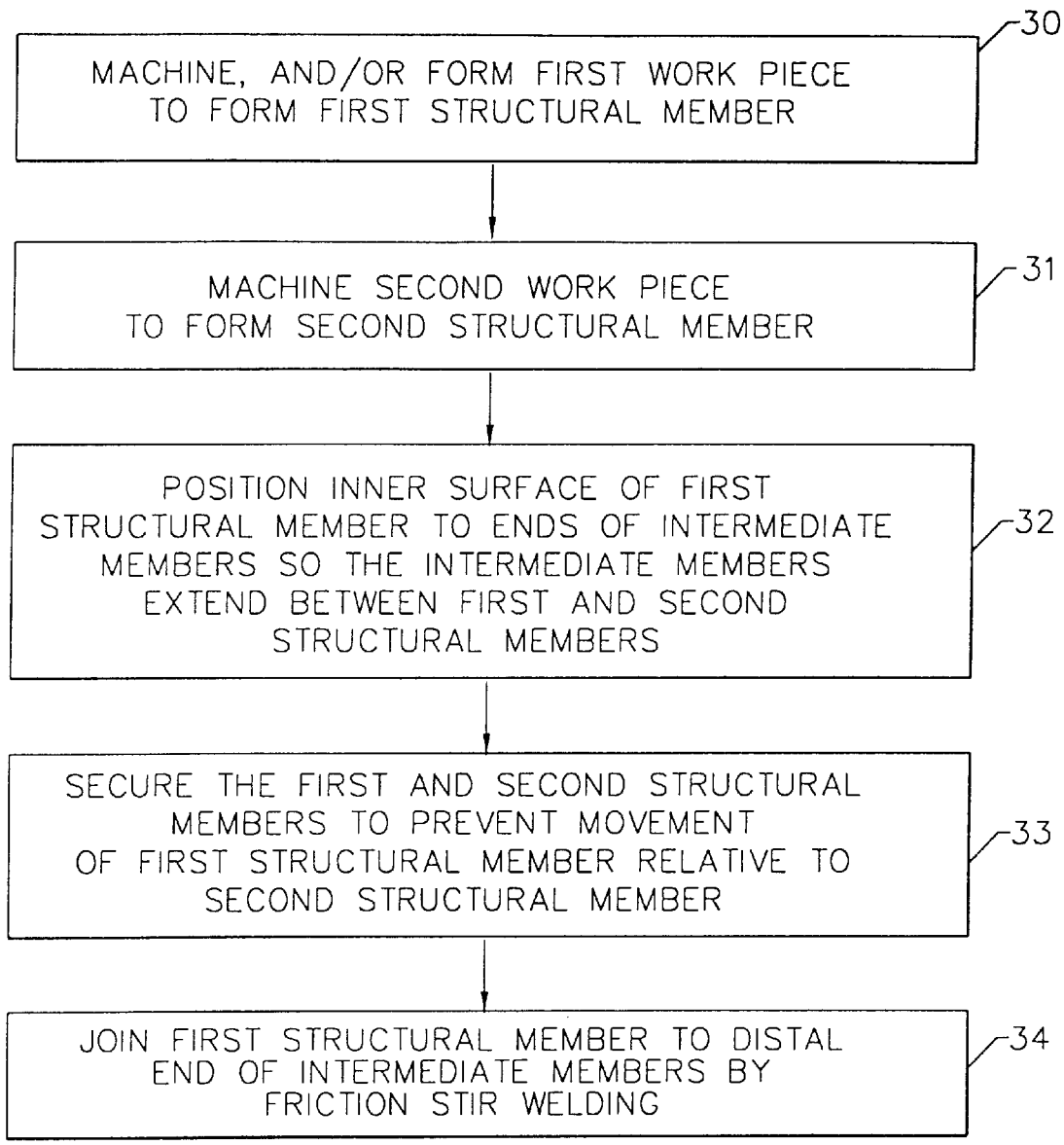
FIG. 5 is a flow chart showing the steps for manufacturing the structural assembly of FIG. 3.

Referring now to FIG. 5, there is illustrated the operations performed to manufacture a structural assembly according to one embodiment of the present invention. The first step includes machining a work piece to form a first structural member having inner and outer surfaces and may be performed simultaneously with the second step. The first structural member may also be formed into a curvilinear geometry. See block 30. The second step includes machining a second work piece to form a second structural member having a plurality of intermediate members, each of the plurality of intermediate members extending outwardly in a predetermined pattern to a corresponding distal end. See block 31.

Next, the inner surface of the first structural member is positioned adjacent to the distal ends of the plurality of intermediate members so that the plurality of intermediate members extend between the first and second structural members. See block 32. The first and second structural members must then be secured to each other by spot welding and then to the work table by clamping, so as to prevent movement of the first structural member relative to the second structural member and the plurality of intermediate members. See block 33.

The first structural member is then joined to the corresponding distal ends of each of the plurality of intermediate members by friction stir welding. See block 34. As described above, the friction stir welding is preformed by extending rotating friction stir welding probe through the first outer member into the distal end of the intermediate member. Thereafter, the structural assembly is secured to other structural assemblies to form the frame of an aircraft.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A method of manufacturing a structural assembly, comprising the steps of:

machining a first work piece to form a first structural member having outer and inner surfaces;

machining a second work piece to form a second structural member, the second structural member having a plurality of intermediate members extending outwardly to a distal end;

positioning the inner surface of the first structural member adjacent to the distal ends of the plurality of intermediate members so that the plurality of intermediate members extend between the first and second structural members;

securing the first and second structural members so as to prevent movement of the first structural member relative to the second structural member; and inserting a rotating friction stir welding probe through the outer surface of the first structural member at a position aligned with a respective intermediate member to thereby join the first structural member to the distal end of the respective intermediate member by friction stir welding.

2. A method according to claim 1 further comprising repeating said inserting step at positions as figured with each of the intermediate members to thereby joint the first structural member to the distal end of each of the plurality of intermediate members by friction stir welding.

3. A method according to claim 1 wherein said inserting step comprises inserting the rotating friction stir welding probe completely through the first structural member and into the distal end of the respective intermediate member.

4. A method according to claim 1 further comprising the step of moving the rotating friction stir welding probe through the first structural member along a path that traces the distal end of the respective intermediate member to thereby form a continuous joint along the length of the respective intermediate member.

5. A method according to claim 1, further comprising the step of forming the first structural member into a curvilinear geometry.

6. The method of claim 1, further comprising the step of securing the structural assembly to other structural assemblies to form the frame of an aircraft.

7. A structural assembly, comprising:

a first structural member;

a second structural member spaced from said first structural member and having a plurality of intermediate members extending outwardly, each of said plurality of intermediate members extending between said first structural member and said second structural member; and a friction stir weld joint made by inserting a rotating fraction stir welding probe through the outer surface of the first structural member and which joins a respective intermediate member and said first structural member.

8. The structural assembly of claim 7 wherein said first structural member and said second structural member comprise dissimilar metals.

9. The structural assembly of claim 7 wherein said first and second structural members are formed of materials selected from the group consisting of aluminum, AA 2000 series aluminum alloys, and AA 7000 series aluminum alloys.

10. The structural assembly of claim 7 further comprising a plurality of friction stir weld joints joining respective ones of said intermediate members and said first structural member.

11. The structural assembly of claim 7 wherein the friction stir weld joint extends along the length of the respective intermediate member.

12. The structural assembly of claim 7 wherein the respective intermediate member is disposed perpendicularly in relation to the first structural member.

13. The structural assembly of claim 7 wherein at least one of the first and second structural members is comprised of an unweldable material.

\* \* \* \* \*

UNITED STATES PATENT AND TRADEMARK OFFICE
CERTIFICATE OF CORRECTION

PATENT NO. : 6,051,325
DATED : April 18, 2000
INVENTOR(S) : Talwar et al.

It is certified that error appears in the above-identified patent and that said Letters Patent is hereby corrected as shown below:

Title page, [56] References Cited, FOREIGN PATENT DOCUMENTS, line 1, "Japan" should read --European Patent Office--.

Column 7, line 22, "fraction" should read --friction--.

Signed and Sealed this

Twenty-seventh Day of March, 2001

*Attest:*

NICHOLAS P. GODICI

*Attesting Officer*   *Acting Director of the United States Patent and Trademark Office*